(12) United States Patent
Song et al.

(10) Patent No.: US 7,899,919 B2
(45) Date of Patent: Mar. 1, 2011

(54) METHOD AND APPARATUS FOR MAKING DEVICES ON A LOCAL NETWORK REMOTELY-ACCESSIBLE

(75) Inventors: Yu Kyoung Song, Yongin-si (KR); Kyung Ju Lee, Goyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/912,128

(22) PCT Filed: Apr. 19, 2006

(86) PCT No.: PCT/KR2006/001457
§ 371 (c)(1),
(2), (4) Date: Jun. 18, 2008

(87) PCT Pub. No.: WO2006/112664
PCT Pub. Date: Oct. 26, 2006

(65) Prior Publication Data
US 2008/0263124 A1 Oct. 23, 2008

(30) Foreign Application Priority Data
Jul. 25, 2005 (KR) .................... 10-2005-0067502

(51) Int. Cl.
*G06F 15/16* (2006.01)
*G06F 15/173* (2006.01)
(52) U.S. Cl. .................... 709/229; 709/219; 709/224
(58) Field of Classification Search .......... 709/220–227, 709/229, 217–219
See application file for complete search history.

(56) References Cited

U.S. PATENT DOCUMENTS

| | | | |
|---|---|---|---|
| 6,801,507 B1 * | 10/2004 | Humpleman et al. | 370/257 |
| 7,039,858 B2 * | 5/2006 | Humpleman et al. | 715/205 |
| 7,103,834 B1 * | 9/2006 | Humpleman et al. | 715/205 |
| 7,200,683 B1 * | 4/2007 | Wang et al. | 709/250 |
| 7,308,645 B2 | 12/2007 | Humpleman et al. | |
| 7,325,057 B2 * | 1/2008 | Cho et al. | 709/224 |
| 7,349,967 B2 | 3/2008 | Wang | |
| 7,490,293 B1 * | 2/2009 | Humpleman et al. | 715/734 |
| 2003/0063608 A1 * | 4/2003 | Moonen | 370/390 |
| 2004/0006647 A1 | 1/2004 | Kim et al. | |
| 2004/0016242 A1 | 1/2004 | Song et al. | |
| 2005/0099982 A1 * | 5/2005 | Sohn et al. | 370/338 |
| 2006/0037036 A1 * | 2/2006 | Min et al. | 725/1 |
| 2008/0205419 A1 * | 8/2008 | Shin et al. | 370/401 |
| 2009/0037556 A1 * | 2/2009 | Kokkinen et al. | 709/217 |

FOREIGN PATENT DOCUMENTS

EP        1043876        10/2000

(Continued)

*Primary Examiner* — Yemane Mesfin
(74) *Attorney, Agent, or Firm* — Lee, Hong, Degerman, Kang & Waimey

(57) ABSTRACT

The present invention relates to method and apparatus for enabling to request querying and/or controlling operations remotely to a device on a home network via Internet. In a method in accordance with the present invention, a device search message is transmitted to a plurality of devices connected to a local network, and device information is created or modified based on whether there are responses to the message from the devices. Afterwards, when a device search message is received a responding message to the received message is transmitted for a device or devices contained in the device information. Whereby, possible communication errors occurred by long-time delay (caused by traveling across large-area network and local network) of a search message can be prevented.

6 Claims, 11 Drawing Sheets

FOREIGN PATENT DOCUMENTS

| | | |
|---|---|---|
| EP | 1182823 | 2/2002 |
| EP | 1345381 | 10/2006 |
| JP | 2003092636 | 3/2003 |
| JP | 2004112505 | 4/2004 |
| KR | 1020010110021 | 12/2001 |
| KR | 10-2004-0021305 | 3/2004 |
| KR | 1020050079840 | 8/2005 |

* cited by examiner

```
<html>
<title>AVAIABLE HOME NETWORKED DEVICES</title>
DEVICES<br>
<a href="192.168.1.20:/gasrangeUI.html">GAS RANGE</a href><br>
<a href="192.168.1.41:/heaterUI.html">HITTER</a href><br>
<a href="192.168.1.32:/lightUI.html">LIGHT</a href><br>
<html>
```

~ 401

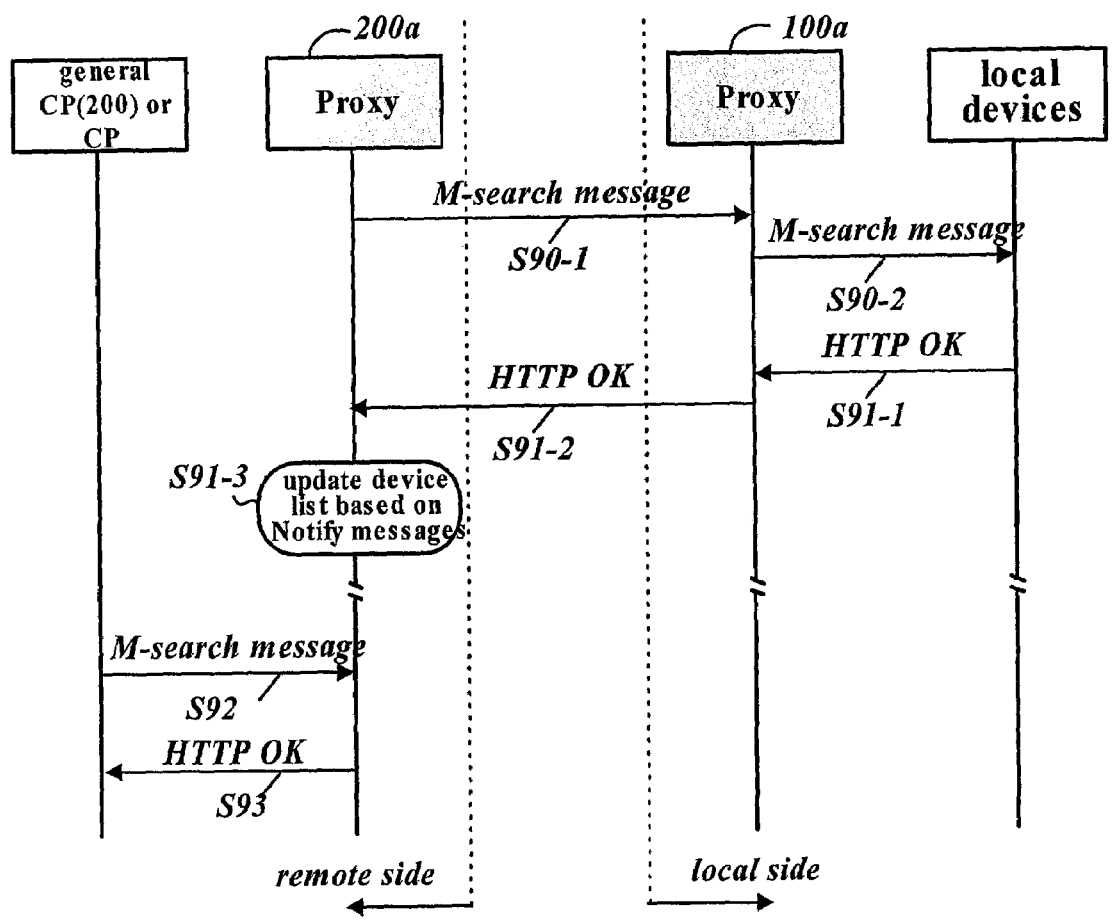

METHOD AND APPARATUS FOR MAKING DEVICES ON A LOCAL NETWORK REMOTELY-ACCESSIBLE

1. TECHNICAL FIELD

The present invention relates to method and apparatus for enabling remote query and control for a device on a home network.

2. BACKGROUND ART

As an increasing number of electronic appliances such as video or audio apparatuses or PCs have been used in a home and digital techniques have become dominant in video and audio signal processing, the need for communication between home electronic appliances or communication with other networks is also increasing. In addition, the demand for controlling home electronic appliances through a single mobile apparatus such as a PDA is also increasing.

To meet the demand, home networking technology has emerged for connecting home electronic appliances such as digital TVs or DVD players. The UPnP (Universal Plug and Play) is a key technology required for implementing the home network.

FIG. 1 shows an exemplary UPnP network. According to the UPnP specification, every home network requires an apparatus called the IGD (Internet Gateway Device) 20, which assigns addresses to elements or nodes 10, 11, 12 connected to the network and also acts as a gateway to external networks, e.g., the Internet. The IGD 20 can be a stand-alone device or embedded within another apparatus such as a PC or refrigerator.

Each UPnP network has a control point (CP) 10, which discovers and controls devices connected to the UPnP network, processes events, and enables query and control through the provided user interface (UI). Precisely speaking, the control point is a control application program executed on a device. However, the device executing the control application program is also referred to as the control point.

The control point 10 provides the UPnP discovery service at startup, which finds electronic devices connected to the home network by transmitting a search message to the home network and obtains information regarding the found devices. The control point 10 then provides the obtained information for a user through a user interface specially designed for the home network, thereby allowing the user to request a certain service using the user interface.

The user of the home network may want to request remote query or control for a device on the home network from outside the home network. In this case, however, the user cannot access the home network through the Internet simply by using the control point 10 at a remote location. Even in the case where the user utilizes a proper remote access application program (e.g., virtual private network (VPN) application), communication errors are likely to occur due to a failure in the communication protocol caused by a time delay in the communication between the home network and the remote site.

3. DISCLOSURE OF THE INVENTION

It is an object of the present invention to allow remote query and/or control for a device on a local network via a general web browser.

It is another object of the present invention to provide a method and apparatus for detecting structural changes in a local network such as addition or removal of a device using a general web browser.

It is yet another object of the present invention to enable remote query and/or control for a device on a local network using a communication protocol on which the local network is based without problems due to communication delay.

One method in accordance with the invention creates a document for a device list based on information provided by a plurality of devices on a local network in a language that can be interpreted by a browser, invokes the browser to make the browser interpret/process the created document, transmits a device search message to the local network periodically, modifies the created document based on the response to the message, and makes the modified document to be interpreted/processed by the browser.

Another method according to the present invention transmits a device search message to a plurality of devices on a local network periodically, modifies device information based on the response to the message, and transmits a response message for devices included in the device information if a message for searching devices is received.

Yet another method according to the present invention transmits a device search message to a remote device periodically, modifies device information based on the response to the message, and transmits a response message for devices included in the device information if a message for searching devices is received.

In one embodiment, the browser is a web browser running on a PC or a notebook.

In another embodiment, the browser is a WAP browser running on a PDA or a cellular phone.

In one embodiment, the document is written in a markup language such as html.

One embodiment of the invention extracts presentation information (e.g., URL) from a device description provided by each of the plurality of devices and creates the document a device list based on the extracted presentation information.

In one embodiment, if there is a response to the device search message from a device which does not belong to the plurality of devices for the first time, the created document is modified such that the device is included in the device list and the browser or is invoked so that the modified document may be processed.

In one embodiment, the created document is modified such that a device which does not respond to the periodically transmitted device search message is removed from the device list and the browser is invoked so that the modified document may be processed.

In one embodiment, the creation or modification of device information and responding to a received device search message are performed by a proxy running on a device connected to the local network.

In another embodiment, the creation or modification of device information and responding to a received device search message are performed by a proxy located at a remote site.

In one embodiment, the proxy is executed on a gateway device for relaying data between devices on the local network and for assigning and managing network addresses.

In another embodiment, the proxy is executed on a device which tries to access a device on the local network from a remote site.

In one embodiment, the device search message conforms to the SSDP (simple service discovery protocol).

4. BRIEF DESCRIPTION OF THE DRAWINGS

FIGS. 8a and 8b illustrate exemplary schemes for exchanging messages via the proxies in accordance with the embodiment shown in FIG. 7.

5. BEST MODE FOR CARRYING OUT THE INVENTION

In order that the invention may be fully understood, preferred embodiments thereof will now be described with reference to the accompanying drawings.

Figure 1:
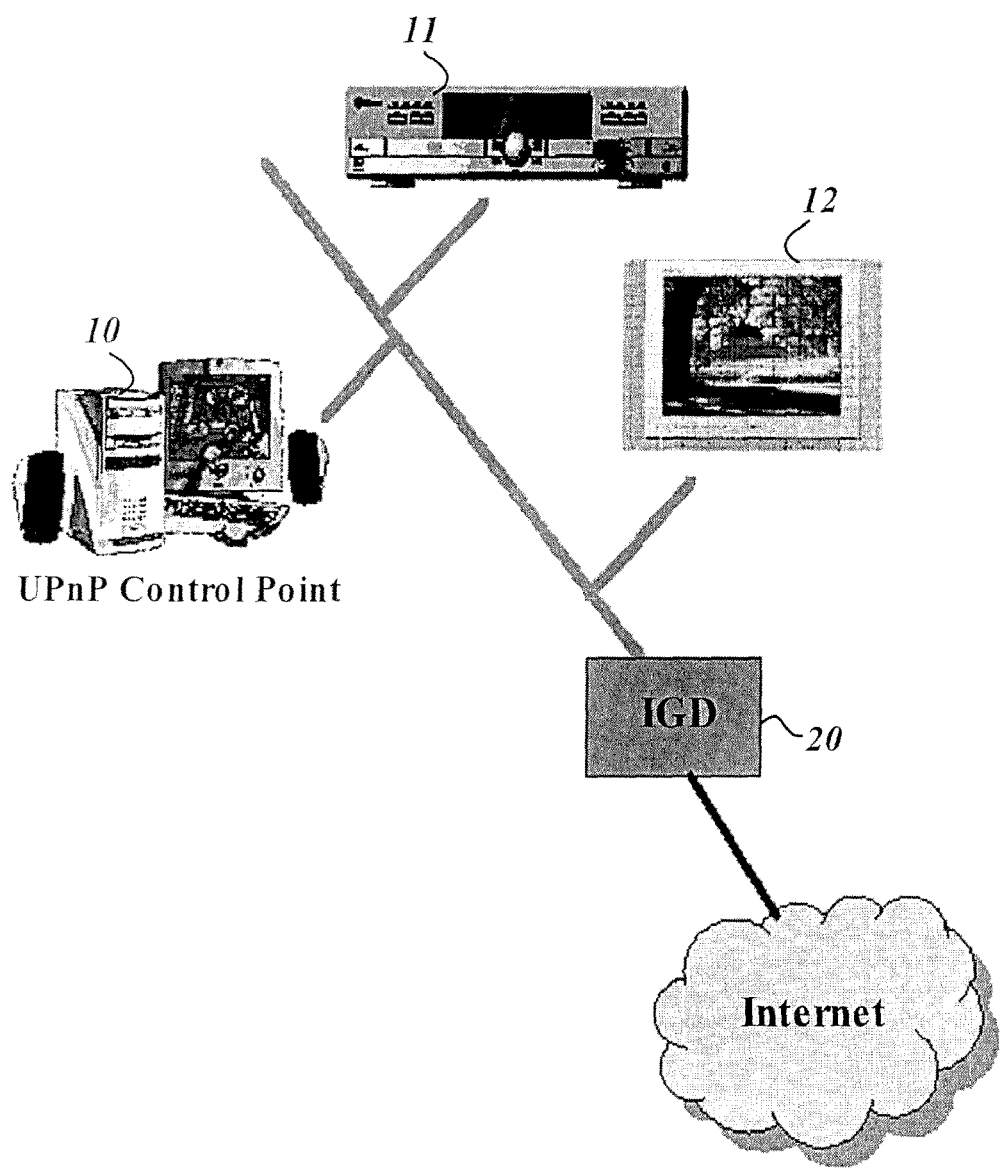
FIG. 1 illustrates an exemplary UPnP home network.
Figure 2:
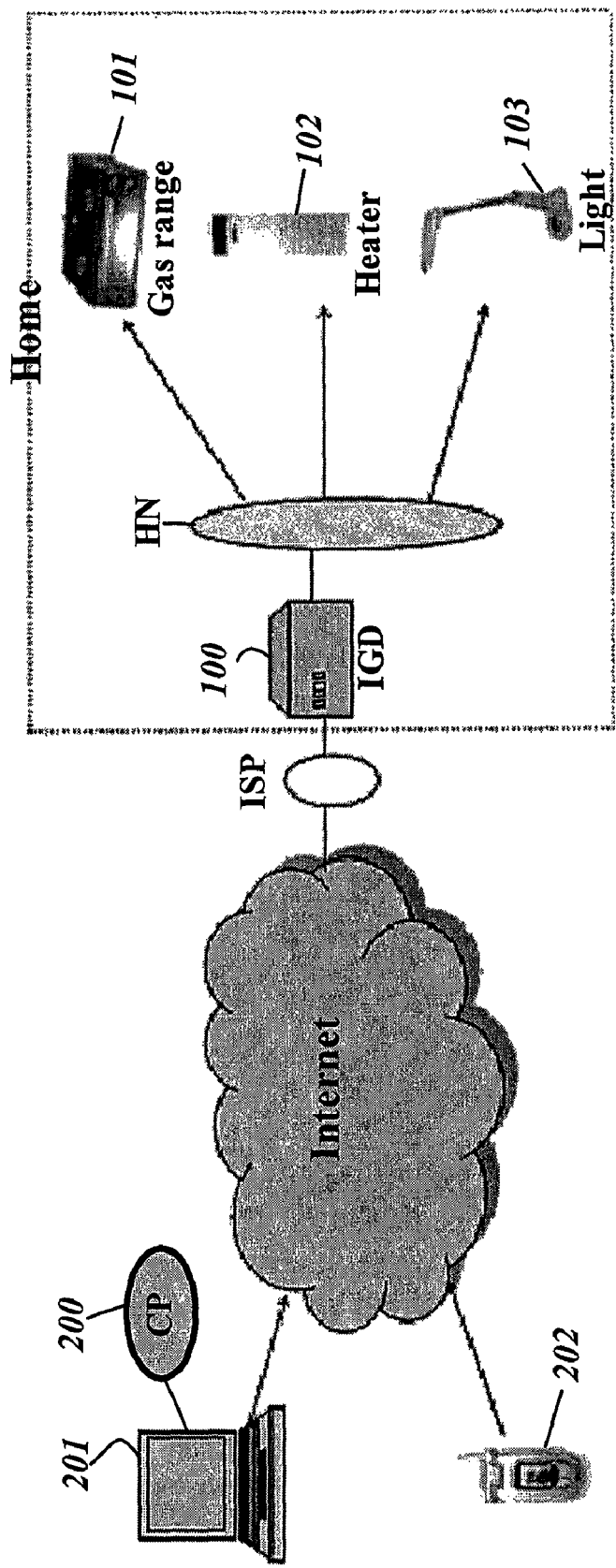
FIG. 2 illustrates an exemplary home network in accordance with one embodiment of the present invention.

FIG. 2 shows an exemplary home network in accordance with one embodiment of the present invention. The network enables a remote access to a device on the network through a general web browser.

A remote user has an Internet-accessible notebook computer 201 in which a general control application 200 in accordance with the present invention is installed. The general control application 200 is also called the general control point. The notebook computer 201 has a public IP address for accessing the Internet. The user or the general control application 200 knows the public IP address of an IGD 100 of his/her home network. The IP address of the IGD 100, which is assigned by an ISP (Internet Service Provider), may be a dynamic IP address, in which case the user finds the dynamic IP address thereof using an appropriate method. The method for finding the dynamic IP address has no relevance to the present invention and therefore the method is not described here.

The general control point 200 performs the discovery procedure at startup by transmitting a search message, the header of which contains the public IP address of the IGD 100. The search message is received by the IGD 100 via the Internet and the IGD 100 notifies the home network of the search message after removing the IP header thereof by an address conversion process.

Figure 3A:
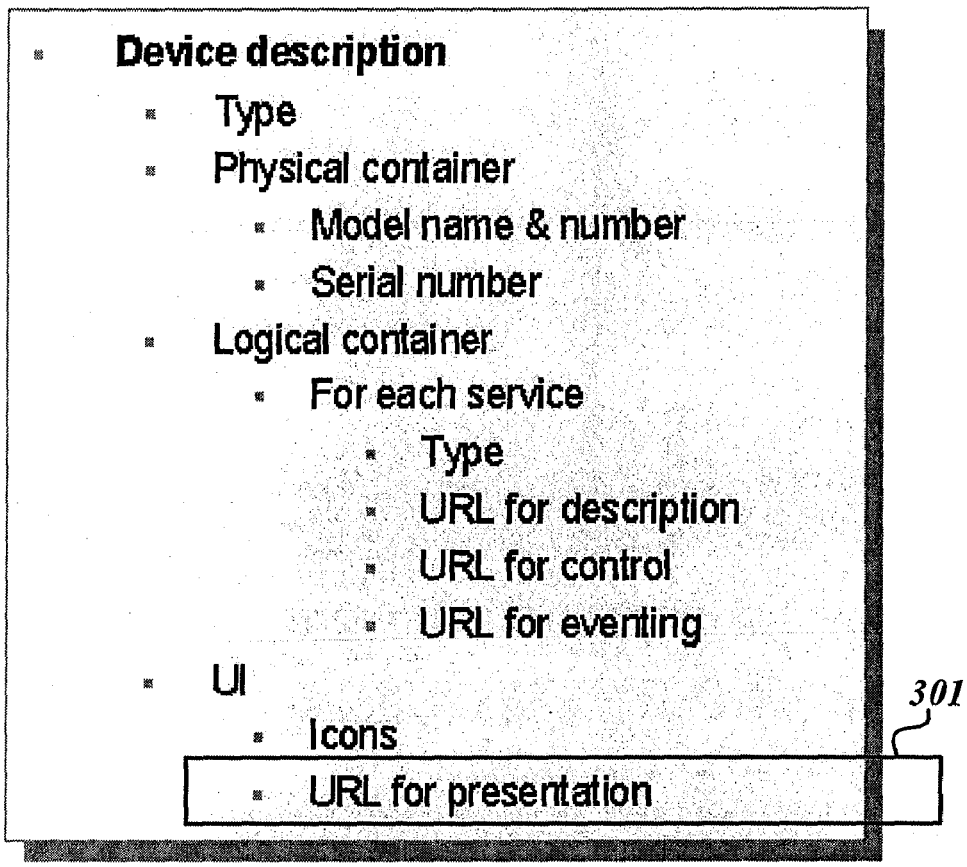
FIGS. 3a and 3b illustrate exemplary formats of device description and service description provided by UPnP devices.
Figure 3B:
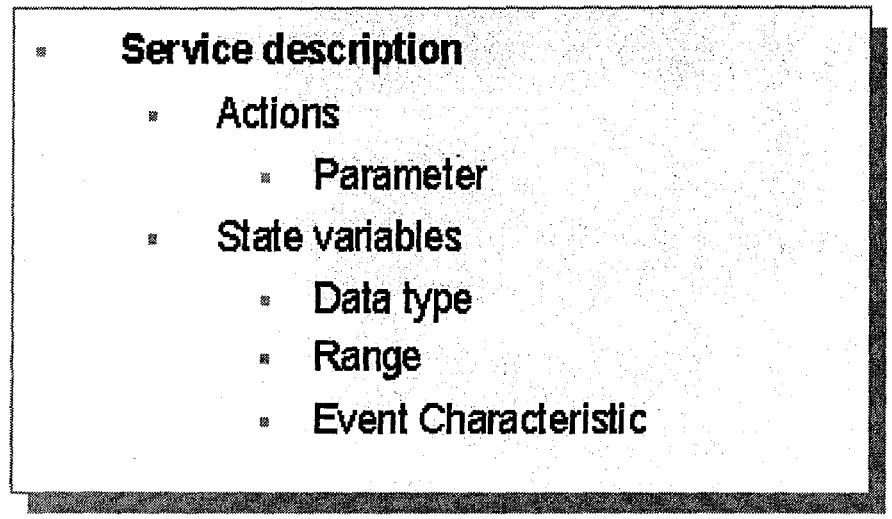

Every device on the home network responds to the received message to notify its existence. The IGD 100 appends a header containing the IP address of the notebook computer 201 to each response message, thereby allowing the response message to be received by the general control point 200 via the Internet. The general control point 200 registers the device found in each of the response messages at its own device list and requests each of the found devices to provide device description. Each device responsive to the request provides device description as illustrated in FIG. 3a and service description as illustrated in FIG. 3b for the general control point 200.

In the case where a VPN client starts running on the notebook computer 201, one of private IP addresses available for devices on the home network is assigned to the notebook computer 201 by the IGD 100. As a result, the general control point 200 and the general browser can communicate with devices on the home network through the VPN client as if the general control point 200 were directly connected to the home network.

Figures 4A, 4B:
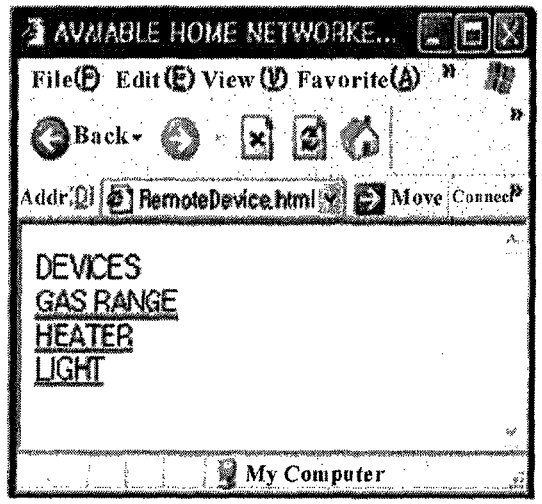
FIG. 4a illustrates an exemplary document for listing available devices, created based on device descriptions provided in accordance with the present invention.
FIG. 4b illustrates an exemplary screen output according to the document shown in FIG. 4a displayed by a browser.

The general control point 200 parses the device description received from each of the devices to extract presentation information such as a URL (Universal Resource Locator) 301. Based on the obtained information, the general control point 200 creates a markup-language document for listing URLs for presentation, associated with devices (e.g., the html document as shown in FIG. 4a) and stores the document in a file. The html document is assigned an appropriate title (e.g., available home network devices) by the general control point 200.

When the document is completed, the general control point 200 invokes the general web browser installed in the notebook computer 201 with the document title as an input argument. The web browser interprets the document whose title is provided as the input arguments and outputs the content thereof. FIG. 4b is the screen output of the web document shown in FIG. 4a, displayed by the web browser.

Figure 5A:
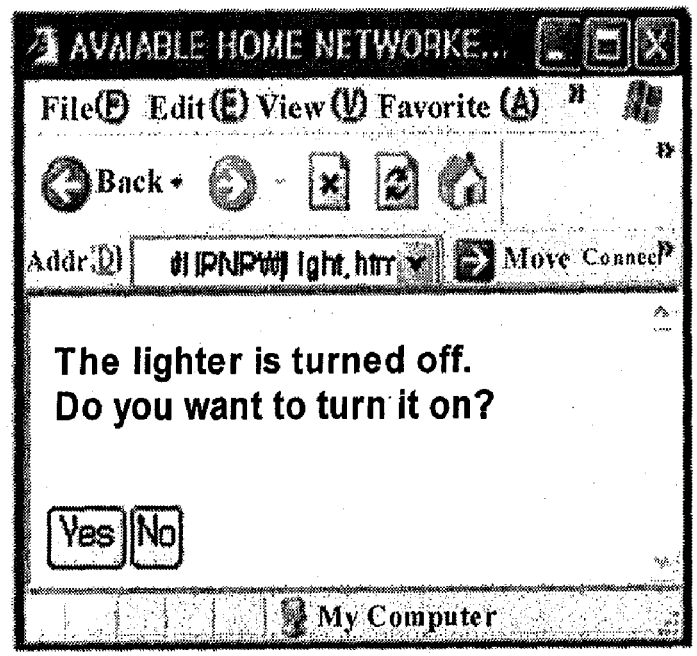
FIGS. 5a and 5b illustrate exemplary screen output according to an html document for control of a device and an html document for a response to a particular action, displayed by the web browser.

After the document is displayed as shown in FIG. 4b, the devices on the home network can be queried and/or controlled via the web browser. If the user selects a device (e.g., electric light stand) from the output screen, the URL 401 corresponding to the electric light stand in FIG. 4a is transmitted to the home network device designated by the URL (i.e., electric light stand 103). The electric light stand 103 then provides a presentation page therefor (e.g., the document titled lightUI.html), which will be displayed as shown in FIG. 5a by the web browser. The presentation page enables the user to control the power of the electric light stand 103. The buttons on the displayed presentation page are linked to UPnP actions for queries or control operations for the selected device. If the user selects an item on the presentation page, the action associated with the selected item is transmitted to the device and therefore the selected action for query or control is executed.

Figure 5B:
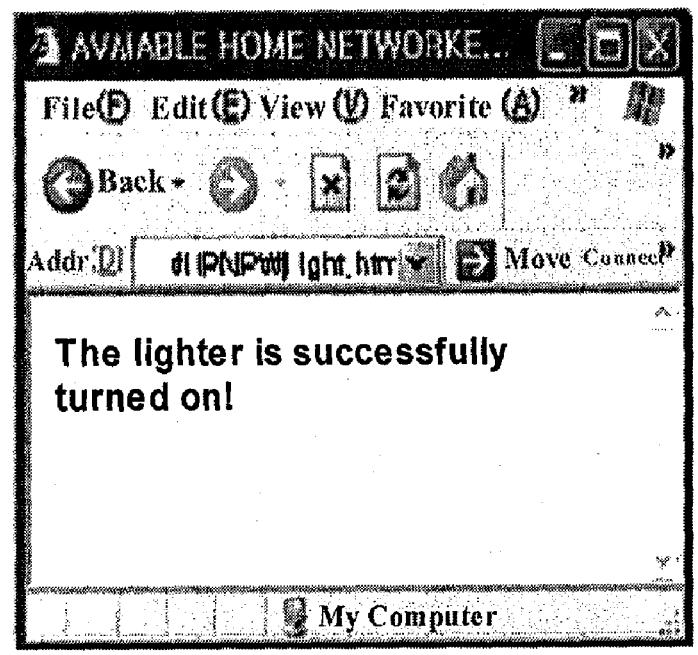

If the user selects the button having 'yes' thereon in FIG. 5a, the UPnP action for turning on the electric light stand 103 is transmitted to the electric light stand 103. The electric light stand 103 then turns on its power and transmits an html document for indicating the result of the action back to the browser, thereby allowing the user to get informed of the result of the action through the web browser output as shown in FIG. 5b. The control action for the electric light stand 103 is a mere example of applying the principle of the present invention and thus more sophisticated queries or control operations for other devices can be performed via the web browser in the same manner.

Figure 6A:
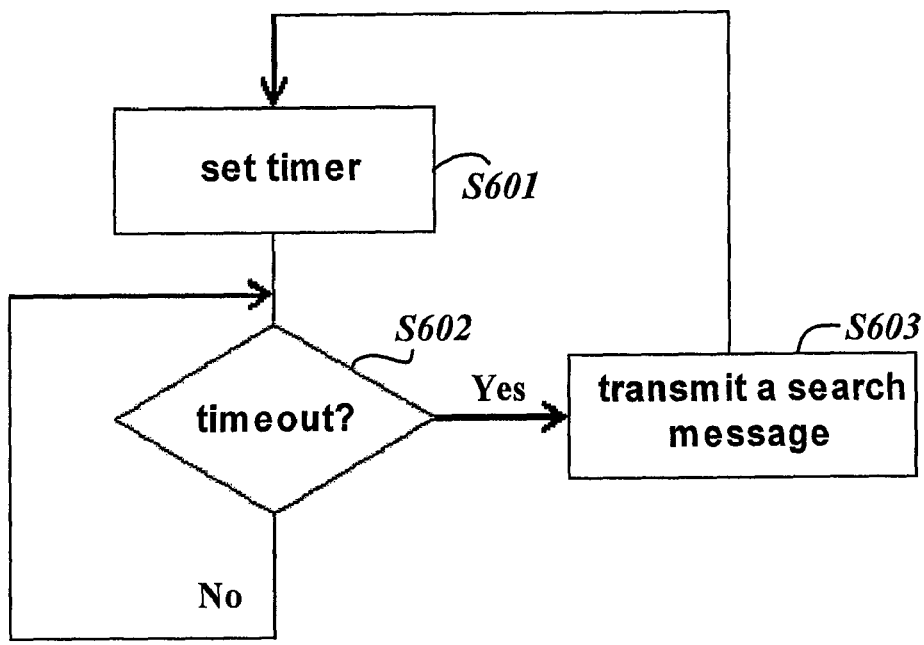
FIGS. 6a and 6b illustrate flow diagrams for transmitting a device search message to the home network periodically and for updating the document for listing devices based on the response to the search message in accordance with one embodiment of the invention.

Even after the web browser is invoked, the general control point 200 transmits the search message at regular intervals to keep informed of changes in the home network (e.g., the case where a new device joins the home network or a registered device is removed from the home network). To this end, the general control point 200 sets a timer to a predetermined value (S601) as shown in FIG. 6*a*. If the timer expires (S602), the general control point 200 retransmits the search message to the home network (S603) and the abovementioned procedure is repeated. Consequently, the search message is multicast to the home network periodically and devices on the home network responds to the search message to notify its existence as described before.

Figure 6B:
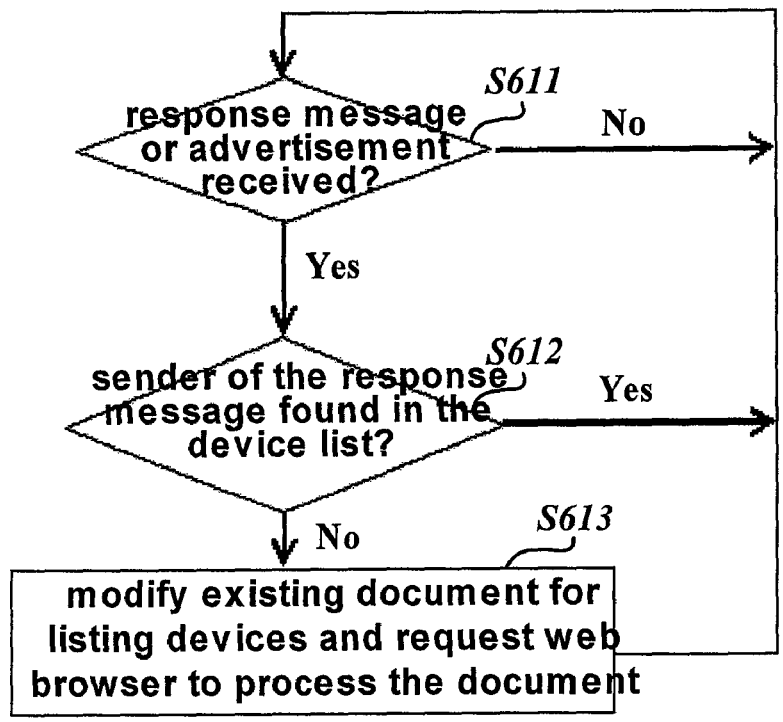

FIG. 6*b* is a flow diagram showing how the general control point 200 processes the response messages. If a response message is received (S611), the general control point 200 examines whether the address of the sender thereof is found in the device list which it manages. If the address is not found in the device list (S612), the message was sent by a device newly connected to the home network. If so, the general control point 200 updates its device list so that the new device can be included therein. And the general control point 200 requests the new device to provide its device description, receives the requested device description, obtains the URL of the presentation page for the new device, and updates the document for listing devices connected to the home network as shown in FIG. 4*a* based on the obtained information.

If a device registered in its device list does not respond to the search message, the general control point 200 determines that the device is removed from the home network and removes the presentation URL for the device from the document for listing devices. However, the general control point 200 does not remove the presentation URL immediately after a device does not respond to the search message. Instead, the general control point 200 removes the presentation URL for the device if the device does not respond to the search message more than N times successively (e.g., 3 times in a row).

If the document for listing devices is modified, the general control point 200 re-invokes the web browser with the title of the document as an input argument (S613). Before re-invoking the web browser, the general control point 200 may terminate the previously invoked web browser using the process ID returned when the web browser was invoked.

Alternatively, the general control point 200 may provide the modified document for the previously invoked web browser so that the web browser can display the content of the updated document in the current browser screen without re-invoking the web browser.

The user may request remote query or control for a device on the home network through a mobile phone 202 or PDA. When making the document for listing devices on the network based on the device descriptions received in the aforementioned manner, the general control point executed on a mobile apparatus according to the present invention makes the document appropriate for wireless browsers (e.g., WAP document).

In another embodiment of the present invention, the IGD 100 acts as a VPN server and the notebook computer 201 executes a VPN client, thereby allowing the notebook computer 210 to utilize the user interface of the UPnP-based control point of the home network. When the VPN client starts running on the notebook computer 201, one of private IP addresses available for devices on the home network is assigned to the notebook computer 201 by the IGD 100. As a result, the control point executed on the notebook computer 201 can communicate with devices on the home network for query or control (e.g., UPnP actions) through the VPN client as if the control point 200 were directly connected to the home network. It is also possible that the IGD 100 communicates with the remote devices by forming a VPN.

In the previous embodiments, the search message transmitted by a remote application program (e.g., the general control point 200 or a UPnP-based control point) to obtain the latest list of devices may be received by the destination home network via a plurality of local networks including the local network to which the remote device belongs as well as the Internet. As the number of networks including the Internet across which the message travels increases, the time delay before the message reaches the destination home network also increases. In addition, the Internet does not guarantee even the worst-case message travel time. In this case, it may take too much time for the remote device to receive the response to the search message from devices on the destination local network, and therefore the remote device may not receive the response before timer time-out. If the desired response message (e.g., HTTP OK message) is received after the timer expires, the received message is ignored and the latest list of devices on the local network cannot be obtained.

Figure 7:
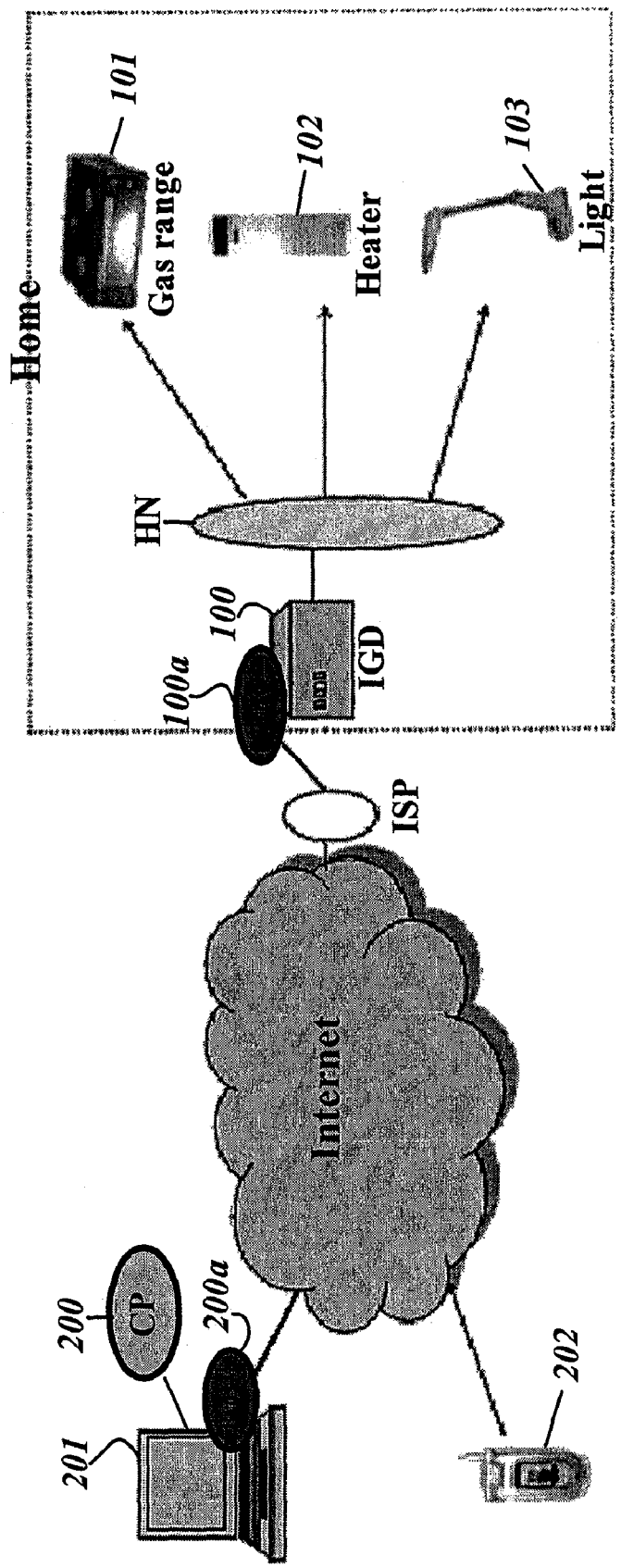
FIG. 7 illustrates an exemplary home network in accordance with another embodiment of the present invention.

In one embodiment of the invention shown in FIG. 7, both the home network and the remote site have a proxy 100*a* and 200*a*, which take the responsibility for the transmission of the discovery message conforming to the protocol on which the home network is based, with a view to preventing the undesirable time delay. The communication protocol in this embodiment is the UPnP. The UPnP employs the SSDP (simple service discovery protocol) for searching devices. However, the present invention is not limited to the particular protocol and thus all variations employing different protocols fall within the spirit and scope of the present invention.

Unlike the network shown in FIG. 7, the proxies 100*a* and 200*a* may be embedded within the IGD 100 and the remote program, respectively.

Figure 8A:
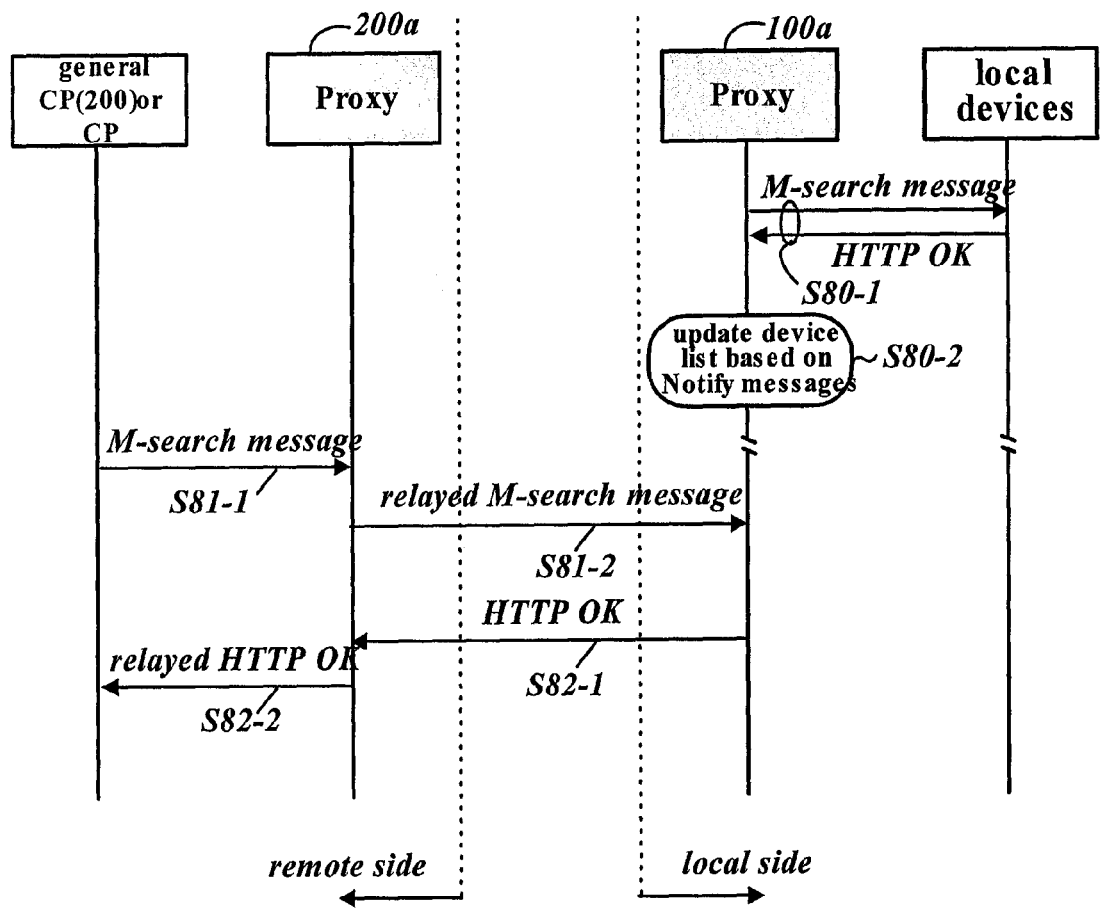

FIG. 8*a* shows an exemplary scheme wherein the proxies 100*a* and 200*a* exchange the SSDP-based search message and the response to the search message for the IGD 100 and the control point 200, respectively.

The proxy 100*a* on the local network first broadcasts an M-search message to the home network and receives responses to the message from devices on the home network (S80-1). The proxy 100*a* then creates a device list for listing devices which responded to the search message. The proxy 100*a* executes step S80-1 periodically and updates the device list at each repetition so that only the devices which respond to the search message are listed therein (S80-2).

Afterwards, a remote application program (e.g., the general control point 200 or a UPnP-based control point) broadcasts an SSDP-based M-search message (S81-1). The M-search message is received by the proxy 200*a* at the remote site. The remote proxy 200*a* stores the received M-search message temporarily and relays the M-search message to the proxy 100*a* on the local network (S81-2). The format of the M-search message may be changed during the relay process. For example, because a multicast message cannot pass through the VPN tunnel, the multicast message is converted into a unicast message before being relayed to the local proxy 100*a*. It is possible that the two proxies adopt a separate communication protocol for relaying the unicast message. For example, because the SSDP message, which is based on the unreliable UDP (user datagram protocol), may be lost, the proxies 100*a* and 200*a* may adopt the reliable TCP (transmission control protocol) to relay messages.

Receiving the search message, the proxy 100*a* on the local network creates a response to the search message for each of the devices listed on the device list which the proxy 100*a* manages without relaying the received message to the home network and transmits the created response to the remote proxy 200*a* (S82-1). Receiving the response, the remote proxy 200a relays the response to the application program which initiated the transmission of the search message (S82-2). The application program regards the response message as having been transmitted by the devices on the home network and performs the procedure for updating the device list. As the procedure was described in detail before, the description of the procedure is omitted here.

In another embodiment of the present invention, if it is detected that there is a change in the home network (e.g., addition of a new device or removal of an existing device) at step S80-2, the proxy 100a on the local network (or the IGD 100) sets the value of a variable for storing 'device status' which it manages to 'changed' and generates an event to the remote application program directly or via the IGD 100. For this operation, the remote application program needs to be registered at the IGD 100 for the event in advance. After generating the event, the value of the variable is set to 'unchanged'.

The application program which receives the event transmits the search message and receives the response to the search message as described above, thereby keeping informed of the latest list of devices on the home network.

In another embodiment of the invention, the remote application program receiving the event obtains the latest list of devices immediately by making a request for a proper action to the IGD 100.

FIG. 8b shows an exemplary scheme for using the proxies 100a and 200a in a different way in accordance with the embodiment shown in FIG. 7. As shown, the remote proxy 200a transmits an M-search message to the corresponding proxy 100a on the home network (S90-1). The proxy 100a relays the received M-search message to the home network (S90-2) and receives the response to the message from devices on the home network (S91-1). When relaying the received search messages to the home network, the proxy 100a may change the format of the search message. For example, the proxy 100a may convert a search message sent in unicast manner or a TCP-based search message into a multicast-formatted message conforming to the SSDP.

The proxy 100a relays the received response messages to the remote proxy 200a (S91-2). The remote proxy 200a creates a device list for listing devices which responded to the search message (S91-3). The remote proxy 200a repeats the steps for transmitting the search message and receiving the response periodically and updates the device list at each repetition so that only the devices which respond to the search message are listed therein (S91-3). The data synchronization between the two proxies 100a and 200a can be achieved by performing the above steps. The method for synchronizing data between the two proxies 100a and 200a is referred to as the synchronization protocol.

Afterwards, if the remote application program (e.g., the general control point 200 or a UPnP-based control point) sends an SSDP-based M-search message in multicast manner (S92), the M-search message is received by the proxy 200a at the remote site. The remote proxy 200a does not relay the search message to the proxy 100a on the local network. Instead, the remote proxy 200a creates a response message for each of the devices listed on the device list which the proxy 200a manages and provides the response messages for the remote application program (S93). The application program regards the response messages as having been transmitted by the devices on the home network and performs the procedure for updating the device list. As the procedure was described in detail above, the description of the procedure is omitted here.

The schemes shown in FIGS. 8a and 8b reduce the time delay before the response to the search message arrives by taking advantage of proxies and thus can prevent communication errors caused by the time delay. The examples shown in FIGS. 8a and 8b only consider the case in which a remote device or remote application program accesses a device on the home network but the principle of the present invention also applies to the opposite case. For example, if a remote device is connected to the home network via an application such as VPN, the control point of the home network can transmit a device search message to the remote device. In this case, the remote proxy 200a and the proxy 100a on the local network perform the steps shown in FIGS. 9a and 9b, respectively. Because the procedures shown in FIGS. 9a and 9b can be easily understood from the detailed description about FIGS. 8a and 8b, FIGS. 9a and 9b are not explained here.

Figure 9A:
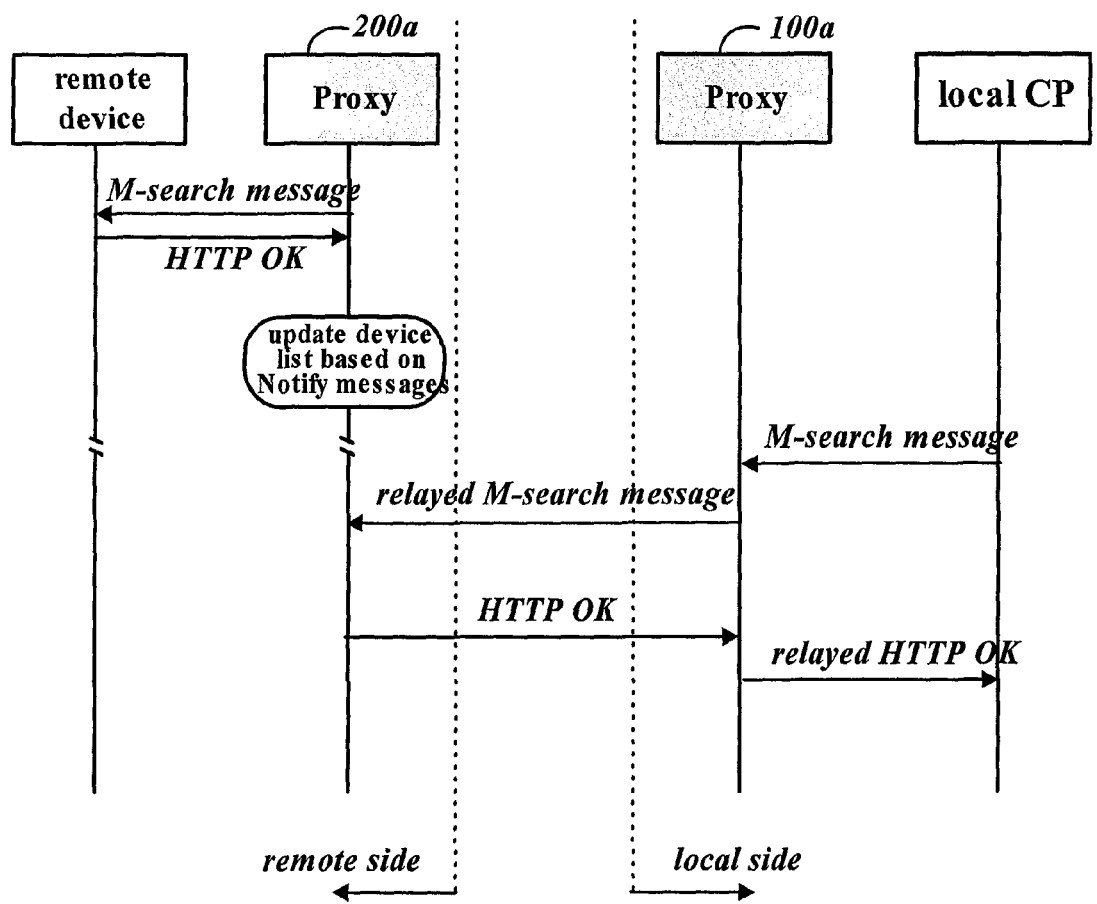
FIGS. 9a and 9b illustrate different exemplary schemes for exchanging messages via the proxies in accordance with the embodiment shown in FIG. 7.
Figure 9B:
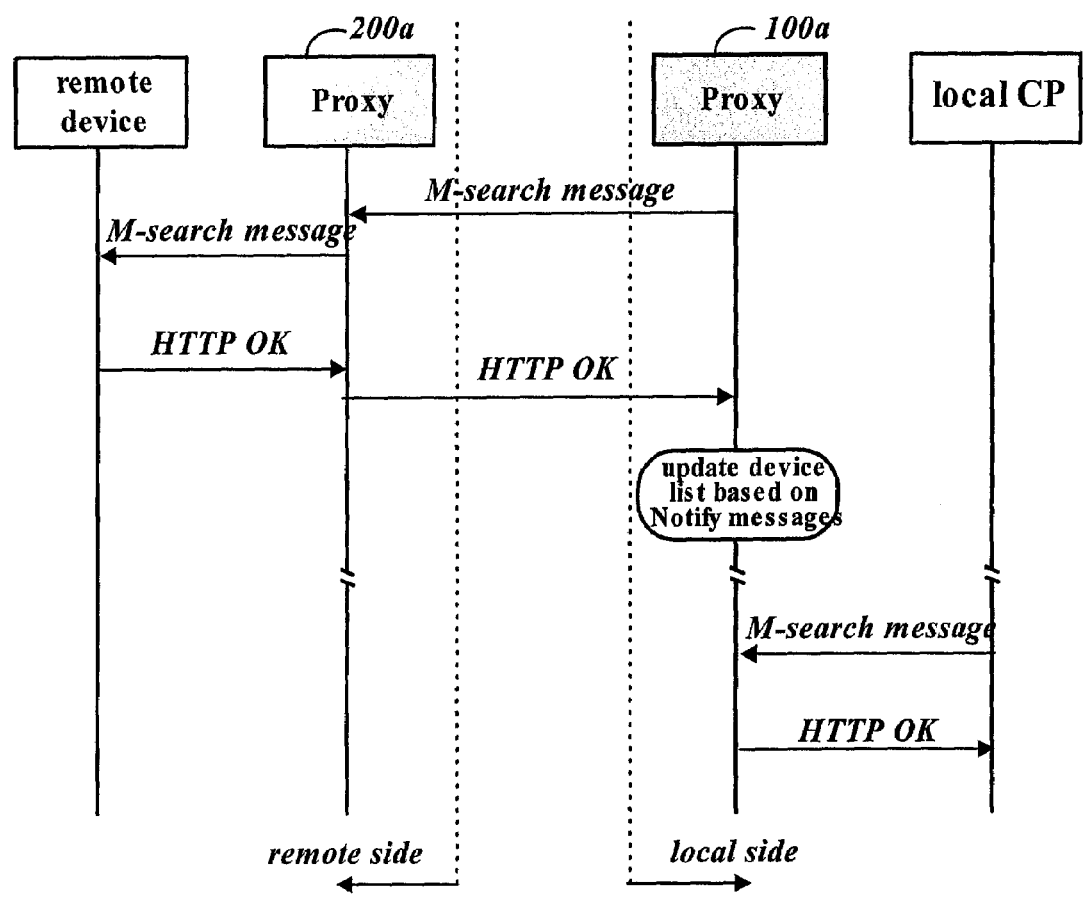

In the embodiments in FIGS. 9a and 9b, it is possible to make the remote device invisible to the control point of the home network by stopping the remote proxy 200a's periodic transmission of the search message (example shown in FIG. 9a) or relay of received response messages (example shown in FIG. 9b).

The present invention described with reference to the preferred embodiments enables a remote device to detect changes in a home network and query/control devices on the home network appropriately depending on the detected changes with no error due to message transmission delay even in the large area network such as the Internet and also enables the remote device to be controlled/queried from the home network, thereby significantly improving the convenience of the home network.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

The invention claimed is:

1. A method for synchronization of information between a remote agent included in a remote network and a local agent included in a home network, the method performed by the remote agent located in the remote network which is outside the home network, the method comprising:

receiving a first notifying message from a local agent for synchronization of information, the local agent located in the home network, and the first notifying message specifying an accessible home network device among at least one home network device included in the home network;

updating a first information comprising a first list of the accessible home network device, based on the received first notifying message, wherein the first information is updated in the remote agent located outside the home network;

creating a response message in response to a first search message when the remote agent receives the first search message from a controller located outside the home network, wherein the first search message is for searching the accessible home network device included in the home network and the response message is created based on the updated first information;

transmitting the created response message to the controller on behalf of the local agent and the home network device;

generating a second list of accessible remote network devices included in the remote network; and transmitting the generated second list to the local agent such that the synchronization of information between the local agent and remote agent is achieved.

2. A remote agent for synchronization of information between the remote agent included in a remote network and a local agent included in a home network, the remote agent located in the remote network which is outside the home network and comprising:
an interface unit configured to transmit and receive data;
a processor configured to:
receive, via the interface unit, a first notifying message from a local agent for synchronization of information, the local agent being located in the home network, and the first notifying message specifying an accessible home network device among at least one home network device included in the home network,
update a first information comprising a first list of the accessible home network device based on the received first notifying message,
wherein the updating is performed in the remote agent located outside the home network,
create a response message, via the interface unit, in response to a first search message when the remote agent receives the first search message from a controller located outside the home network,
wherein the first search message is for searching the accessible home network device included in the home network and the response message is created based on the updated the first information,
transmit, via the interface unit, the created response message to the controller on behalf of the local agent and the home network device,
generate a second list of accessible remote network devices included in the remote network, and
transmit, via the interface unit, the generated second list to the local agent such that the synchronization of information between the local agent and remote agent is achieved.

3. The method of claim 1, wherein the local agent sends a second search message to the accessible home network device, the second search message for searching the accessible home network device included in the home network, the local agent transmits the first notifying message to the remote agent when the local agent receives a second notifying message from the accessible home network device in response to the second search message, wherein the first notifying message is generated using the second notifying message.

4. The method of claim 1, wherein the received first notifying message is based on a transmission control protocol (TCP).

5. The remote agent of claim 2, wherein the local agent sends a second search message to the accessible home network device, the second search message for searching the accessible home network device included in the home network, the local agent transmits the first notifying message to the remote agent when the local agent receives a second notifying message from the accessible home network device in response to the second search message, the first notifying message is generated using the second notifying message.

6. The remote agent of claim 2, wherein the received first notifying message is based on a transmission control protocol (TCP).

\* \* \* \* \*